(12) United States Patent
Sheehan et al.

(10) Patent No.: US 7,171,374 B1
(45) Date of Patent: Jan. 30, 2007

(54) UTILITY RESOURCE AGGREGATION AND ALLOCATION

(75) Inventors: David J. Sheehan, Ft. Lee, NJ (US); James I. O'Hern, Little Silver, NJ (US)

(73) Assignee: Consensis, LLC, Newark, NJ (US)

( * ) Notice: Subject to any disclaimer, the term of this patent is extended or adjusted under 35 U.S.C. 154(b) by 0 days.

(21) Appl. No.: 09/547,803

(22) Filed: Apr. 11, 2000

(51) Int. Cl.
*G06Q 90/00* (2006.01)

(52) U.S. Cl. .................. 705/8; 705/7; 705/10

(58) Field of Classification Search ........... 705/7, 705/63, 8, 10, 1, 412, 37; 702/61, 62
See application file for complete search history.

(56) References Cited

U.S. PATENT DOCUMENTS

| | | | | |
|---|---|---|---|---|
| 5,274,571 A | * | 12/1993 | Hesse et al. ............ 700/291 |
| 5,845,266 A | * | 12/1998 | Lupien et al. ........... 705/37 |
| 5,930,773 A | * | 7/1999 | Crooks et al. ........... 705/30 |
| 5,974,403 A | * | 10/1999 | Takriti et al. ........... 705/412 |
| 6,035,285 A | * | 3/2000 | Schlect et al. .......... 705/30 |
| 6,047,274 A | * | 4/2000 | Johnson et al. ......... 705/412 |
| 6,088,688 A | * | 7/2000 | Crooks et al. ........... 705/412 |
| 6,101,484 A | * | 8/2000 | Halbert et al. .......... 705/26 |
| 6,343,277 B1 | * | 1/2002 | Gaus et al. ............. 705/37 |
| 6,366,889 B1 | * | 4/2002 | Zaloom ................... 705/7 |
| 6,418,415 B1 | * | 7/2002 | Walker et al. ........... 705/26 |
| 6,529,839 B1 | * | 3/2003 | Uggerud et al. ......... 702/61 |
| 6,598,029 B1 | * | 7/2003 | Johnson et al. ......... 705/37 |
| 6,618,709 B1 | * | 9/2003 | Sneeringer ............. 705/412 |
| 6,631,356 B1 | * | 10/2003 | Van Horn et al. ....... 705/26 |
| 6,785,592 B1 | * | 8/2004 | Smith et al. ............ 700/291 |
| 2001/0025209 A1 | * | 9/2001 | Fukui et al. ............ 700/291 |
| 2003/0216971 A1 | * | 11/2003 | Sick et al. .............. 705/26 |

OTHER PUBLICATIONS

Screenshots of ElectricityChoice.com, www.electricitychoice.com, Jan. 1999-Mar. 1999 [retrieved on Feb. 4, 2003], 25 pages, retrieved from: google.com and Archive.org.*

"New Website Will Help Consumers Compare and Select Energy Suppliers", PR Newswire, Nov. 11, 1997 [retrieved on Feb. 4, 2003], 2 pages, retrieved from: Dialog, file 813.*

"Web Marketer ElectricityChoice.com signs up 6,500 users for PA", Northeast Power Report, Dec. 17, 1999 [retrieved Feb. 4, 2003], vol. 70, No. 50, 2 pages, retrieved from: Dialog, file 624.*

"On-line Service Begins Aggregating small users", Energy Services and Telecom Report, Aug. 26, 1999 [retrieved Feb. 4, 2003], vol. 40, No. 34, 2 pages, retrieved from: Dialog, file 624.*

(Continued)

*Primary Examiner*—Tariq R. Hafiz
*Assistant Examiner*—B. Van Doren
(74) *Attorney, Agent, or Firm*—Gibbons, Del Deo, Dolan, Griffinger & Vecchione

(57) ABSTRACT

A method and system for utility resource aggregation and allocation is disclosed. User data on utility resource use for a plurality of utility users is collected. Utility resource demand is modeled for an aggregation of a subset of the plurality of utility users. The aggregation of utility users are dynamically matched with a utility source or aggregated utility source.

9 Claims, 13 Drawing Sheets

OTHER PUBLICATIONS

Screenshots of OnlineChoice.com, www.onlinechoice.com, Nov. 28, 1999 [retrieved on Feb. 4, 2003], 3 pages, retrieved from: archive.org and google.com.*

"Utility.com says it will sell power in Nevada", Wind Energy Weekly, Mar. 13, 1999 [retrieved Feb. 4, 2003], vol. 18, No. 843, 1 page, retrieved from google.com.*

"Utility.com Licenses MAISY Energy and Hourly Load Database Marketing System", Jackson Associates, Sep. 14, 1999 [retrieved Feb. 4, 2003], 1 page, retrieved from: google.com.*

"Online Tool Enpowers Users About to Enter the confusing era of electricity deregulation", PR Newswire, Feb. 9, 1998 [retrieved Feb. 4, 2003], 2 pages, retrieved from: Proquest.*

Tate et al., "Energy Agenda", State of New Jersey Board of Public Utilities, Feb. 2, 2000 [Feb 5, 2003], 3 pages, retrieved from: Google.com.*

Yeomens, Michael, "Man From Mars sets up on-line power buying service", North Hills News Record, Jul. 21, 1999 [retrieved Feb. 4, 2003], pp. 1-3, retrieved from: Google.com and archive.org.*

"ElectricityChoice.com-consumer aid to electric deregulation", Online Newsletter, Mar. 1, 1998 [retrieved Feb. 17, 2006], vol. 19, No. 3, pp. 1-2, retrieved from: Dialog, file 636.*

Evans, Mariwyn, "Power to the People", Journal of Property Management, Dec. 1998 [retrieved Feb. 4, 2003], pp. 1-9, retrieved from: Dialog, file 148.*

* cited by examiner

UTILITY RESOURCE AGGREGATION AND ALLOCATION

FIELD OF THE INVENTION

This invention relates generally to the field of utility resource distribution, and more particularly to economic selection, allocation and distribution of deregulated utility resources.

BACKGROUND OF THE INVENTION

Until recently utility companies have provided resources such as electricity, water, natural gas and steam as well as dedicated area distribution networks which link the particular resource to the utility customers. Various state regulatory bodies and local governmental bodies have begun to de-link resource facilities from dedicated networks creating utility companies which provide exclusively the distribution networks and separate generating companies which consumers select to be coupled to their local network to provide service. In the case of electrical utilities, deregulation naturally led to competition between resource providers based largely on consumer's perception of kilowatt unit pricing and, to a lesser degree, on reliability of supply.

In general, consumers are provided limited information on the various resource suppliers and are led by availability utility information sources to make choices based on insufficient data. Compounding the problem is the fact that the marketplace for resource power is quite complex. For example it is known that load-sharing strategies minimizes cost, and load balancing across different users types optimizes resource pricing. Accordingly, there is a need to dynamically aggregate, rearrange connections, and allocate consumers into selective pools, in order to gain the economic advantages promised by deregulation of electric utilities when considering alternative and competitive pricing by different source suppliers.

SUMMARY OF THE INVENTION

The present invention relates to a method and apparatus for pooling utility customers into user groups based upon pricing tariffs, and type of service; availability data from potential resources; and load balancing strategies in forming user groups to achieve optimum economic efficiency for each user group. More specifically, this invention concerns the utilization of dynamically derived pricing data and load balancing customer data to achieve ideal participation in user pools for optimum economic return in view of the dynamic pricing schedule of various resources.

The invention contemplates in one alternative embodiment a central aggregation control system which automatically creates user sub-groups based upon compatible power consumption demands which, joined as a sub group, fit a group profile desirable to resource suppliers. In the embodiment the supplier connections are dynamically rearranged to maximize price advantage over time so that lowest cost is achieved with maximum reliability of supply. In another arrangement sub groups of customers are joined based upon historic power used data, or the time zone of particular users to match optimum supplier demand power profiles. This invention also includes the methodology for choosing optimum strategies for aggregating consumers to achieve idealized load profiles.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention, a method and system for dynamic utility resource aggregation and allocation, is particularly well suited for use with electric suppliers and electric distributors and shall be so described, the present invention is equally well suited for use with other utility resources such as gas, water and steam as well as wholesale distribution and supply systems such as oil and natural gas pipeline networks.

Deregulation

Utilities have typically provided resources such as electricity, water, natural gas and steam through a network which links the source to the consumer. Supply exchanges from one source to another source have enabled utilities to balance their loads. Utility deregulation has resulted in the de-linking of a particular source from a specific distribution network, enabling consumers to select a source supplier independent of their distribution network. The consumer then receives the selected source utility through their existing distribution network. Signing up consumers by source suppliers is done through a variety of means including direct mailing, telemarketing, and Internet based marketing.

Figure 1:
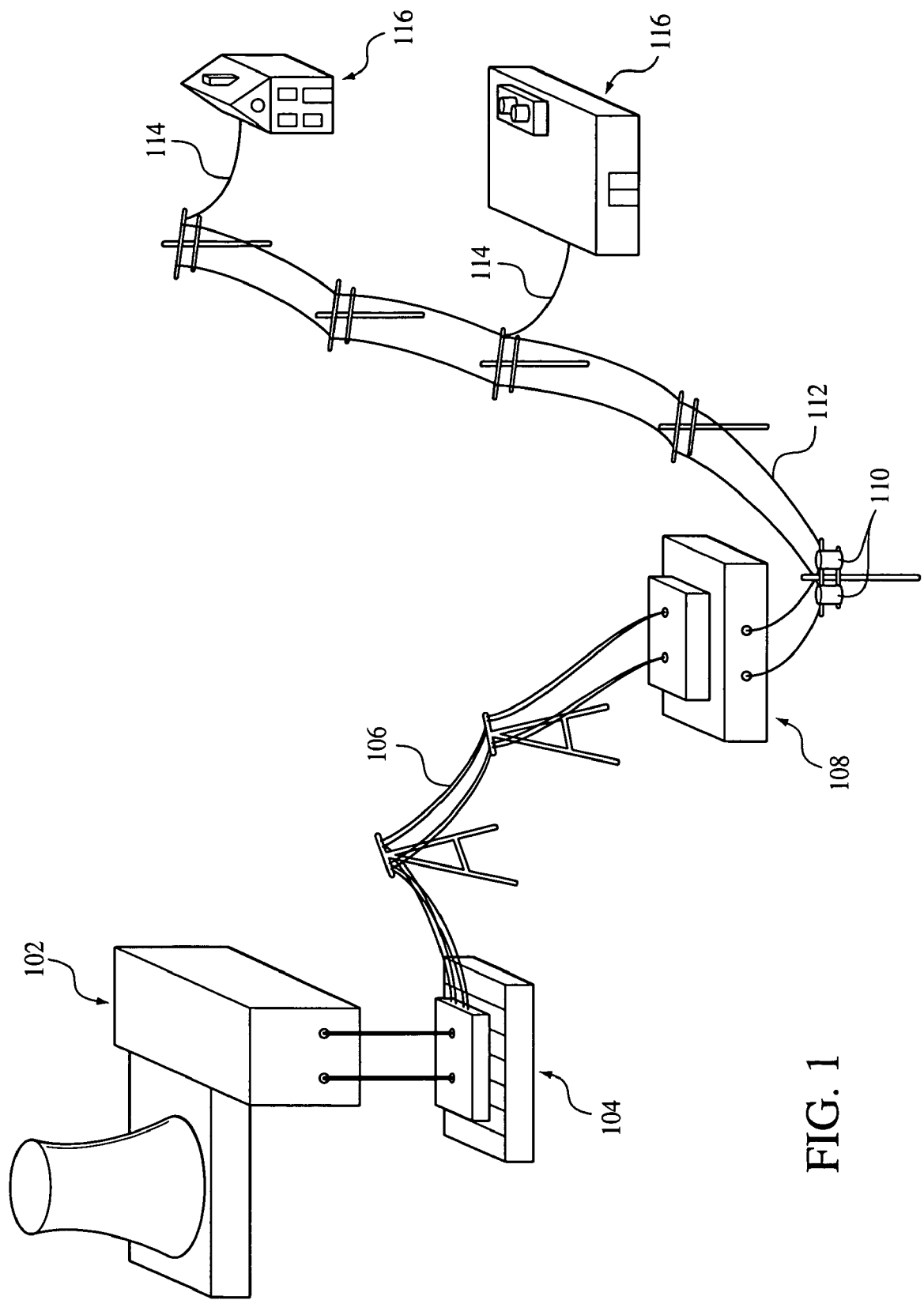
FIG. 1 is a diagrammatic representation of a typical electrical energy network.

Referring to FIG. 1 there is shown a diagrammatic representation of a typical electrical energy network. The typical network comprises at least one generator 102. The generator 102 most commonly uses coal, natural gas, oil, falling water or nuclear energy to produce electricity. Garbage and other waste products can also be burned to produce electrical energy. Additionally generators can harness wind and solar power. The total generator power output rises and falls to meet the total load demands of the electrical network customer. In actual practice, a combination of types of generating units is used to match the demand. Various economic and environmental constraints and generating unit availability determine which particular units supply power at any given time. Typically different combinations of power sources are most economical under different conditions.

The generator 102 is coupled to a transmission substation 104. The transmission substation 104 can step up the voltage output as well as link various lines for increased reliability. Transmission lines 106 are coupled to the transmission substation 104. Transmission lines 106 are high-tension lines, which provide efficient power transmission. Power is a function of voltage times current. For a given power level raising the voltage lowers the current. Power loss in transmission is proportional to the square of the current, thus the higher voltage results in lower power loss.

Distribution substations 108 are coupled to the transmission lines 106. Distribution substations 108 step down the voltage level. A step down transformer 110 is coupled to the distribution substation 108. The step down transformer 110 further decreases the voltage to 120–240 volts. The distribution lines 112 are coupled to the step down transformer 110. Distribution lines 112 are coupled by local drops 114 to power meters (not shown), which begin the wiring at a customer facility 116.

Aggregation

There is a need to be able to dynamically aggregate utility consumers into selective pools, which would then be allocated to source suppliers on a dynamic basis. The aggregated pool of consumers could then be dynamically linked to a particular utility source over a predetermined time period, or could be linked to a dynamic aggregation of supplier sources, including spot market purchases. The aggregated consumers are then billed based upon usage and times of usage which translates into a percentage or ration of the costs borne by the entire sub-group. The billing can be sent directly by the supplier through conventional billing techniques, through Internet/e-mail based billing, and through the use of debit cards, credit cards, electronic funds transfer, etc.

By aggregating a pool of consumers, into a plurality of pools, and aggregating suppliers, utilizing spot purchases, and sole source purchases, the consumer utility demand can now be dynamically linked and allocated to supply sources. The dynamic linking and allocation can be a rule-based system utilizing a decision table, a linear equation, or a combination of these, as well as a variety of other statistical, probability methods, and control theory based methods. By aggregating consumer pools dynamically the consumers can be matched to the best supply sources that meets their criteria without the restriction of a commitment to a single supplier. Dynamic allocation enables the aggregator to negotiate contracts on a dynamic basis in addition to a fixed basis.

Supply sources are connected to the network where the rates of flow (demand) are variable. Such as with gas, water, etc. or with multiple electric generator sources, the aggregation and allocation information provides information to adjust the rates of source flows as necessary. In the case of electric generation, while a typical power plant is not widely variable in output flow, a power supply network typically includes multiple supply sources, including various types of power sources, which may be activated on demand as a backup or supplemental source. This source supply activation scheme is equally well applied to gas and other resources that can be stored until required by demand.

The dynamic aggregation and allocation provides for the efficient utilization of supply resources and increases reliability. Reliability for businesses, which typically purchase a supply on an interruptible basis, can be improved by aggregating the interruptible supply source with a higher cost on demand source. This aggregation is equally well suited for use with consumer pools.

It is desirable for residential energy consumers and small businesses to aggregate, i.e. pool into large purchasing groups in order to effectively bargain with suppliers and achieve maximum savings. The Internet, in particular is an excellent medium to deliver aggregation services to this market because it combines elements of mass communications with the simultaneous ability to deliver customized, personalized services interactively and in real time.

Many small businesses can pool their electrical requirements into a larger representative group. Aggregation is based on the premise that a collective group can pay lower prices and get better service than independent users. For example, a pool of grocery stores mixed with residents who have different power needs, is a stronger bidder for low-cost electric power than independent users.

Retailers can define their electrical use with a load profile. The load profile identifies electricity demand levels by hour, weekday and month. Some larger retail stores and manufacturing businesses are already equipped with load management systems that keep data files of electrical consumption for all equipment and appliances. Smart meters, a mini computer which can be interrogated remotely to provide load profile data, can be installed for smaller users and by pooling data output from various smart meters a user group is created, or a summarized remotely activated virtual group smart meter can be used. Another method of determining a load profile is by forecasting usage. Forecasting can be based on past electrical billing data and appliance usage estimates as well as industry, seasonal and general trend data. Efficient energy aggregation requires a high level of expertise, including engineering (i.e. load profiling) as well as legal, contractual, regulatory and other areas of knowledge and experience. 'Smart metering' devices enable remote meter reading and thus load demand monitoring which can be coupled to the aggregation model in accordance with the model depicted in FIG. 8. Additionally, smart meters can enable load limiting. The smart meter can be utilized to respond to remote signals to disconnect customers or to request the customer reduce load demand. If demand remains too high, partial customer load can be selectively disconnected from a customer defined interruptible circuit.

Dynamic Aggregation

Dynamic aggregation based upon load demand balancing can provide the ability to tailor utility use to better match utility source capabilities. Thus, enabling energy service providers to offer better rates as a result of more efficient utility source utilization. The present invention, a method and system for dynamic utility resource aggregation and allocation, can be viewed as an automatic process control. Sudden supply-load changes unbalance the system. By balancing the supply as well as the demand-load changes, the integrity of the utility network is maintained. Traditionally the supply and demand-load changes were a manually controlled process under the supervision of utilities based on utility criteria. At time, service is interrupted to predetermined customers to shed load, and even entire regions may have the quality of the supply reduced (brown out or pressure drop), and even blacked out or shut off. Fortunately, pleas to customers to reduce demand are usually first made, which may delay or forestall the service interruption. When demand load drops significantly, no utilization is required, as the integrity of the network is maintained, although be it rather inefficiently. Essentially, the utility networks act like open loop systems, with no or ineffective feedback from the output (consumer) to the input (source).

By the application of feedback with respect to the output quantity (energy consumption) for comparison with the input (supply), an error or difference can be sensed. The difference can be balanced by dynamic aggregation of the output load-demand. This can include the use of selective load demand for industrial customers. Further, balancing can be done by selective adding of input (on demand suppliers). Additionally, selective consumers can utilize intelligent metering to restrict some energy utilization when balancing is necessary. This would enable customers to obtain base service at a base rate and when capacity is available, additional service at the base rate or less. When capacity is limited, energy service providers can offer the additional service at a higher or spot rate, with the ability to have a local intelligent agent decide to accept or decline the higher rate and respond to the aggregator so resources could be adjusted automatically, without consumer or producer action. When the output falls below the projected input, reverse balancing by increasing selective load-demand and dropping or turning off on demand suppliers can be done. Again consumers could be offered service at a lower or spot rate and respond to the aggregator so resources could be adjusted automatically, without consumer or producer action.

Dynamic aggregation can be based on feedback from intelligent metering, pool use metering, as well as dynamic forecasting. An intelligent agent must have the capability to take actions leading to the completion of a task or objective, such as accessing and reading an intelligent meter or reading e-mail, without trigger or impetus from an end-user, responding to queries and making decisions based upon a decision table, rule based algorithm, and/or other determinations. Adjusting of the forecasting model would be done dynamically by an intelligent agent, checking to determine if the changes to the model more accurately reflect historical and present conditions, thus enabling more accurate dynamic predictions and forecasting.

In one embodiment, customers are aggregated into pools, then the aggregator submits bid requests to energy service providers and then places the aggregated pool with the lowest qualified bidder.

Load Profiling

The amount of electric power delivered or required at any specific point or points on a system at a particular time is the load. Tracking the load over time presents a load profile or demand profile. Load profiling methodology provides the ability to adjust historic customer load shapes for current weather conditions. The Association of Edison Illuminating Companies (AEIC) Load Research Committee has established a technique called "Dynamic Modeling". A mathematical relationship exists between temperature and class loads for each hour of the day for a given day-type and season of the year. Regression analysis has been performed on load research data in order to derive the functions, which relate customer class loads to weather variables.

Figure 2A:
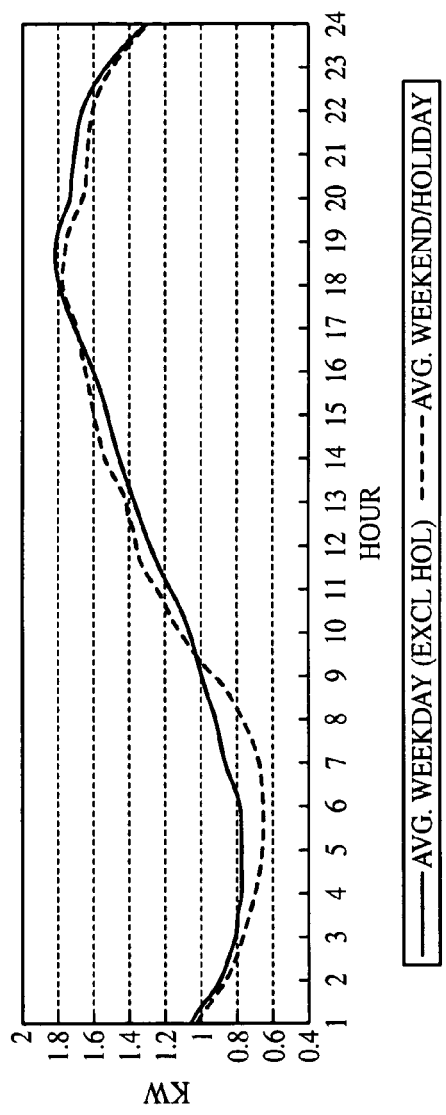
FIG. 2a is a graphical representation of a load profile for a typical class (Residential Service) RS customer.
Figure 2B:
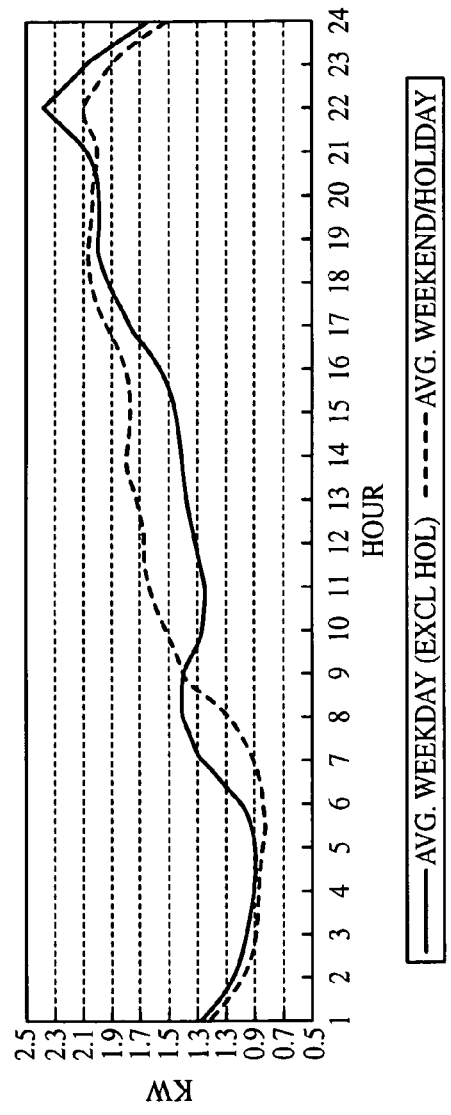
FIG. 2b is a graphical representation of a load profile for a typical class (Residential Time-of-Day) RT customer.
Figure 2C:
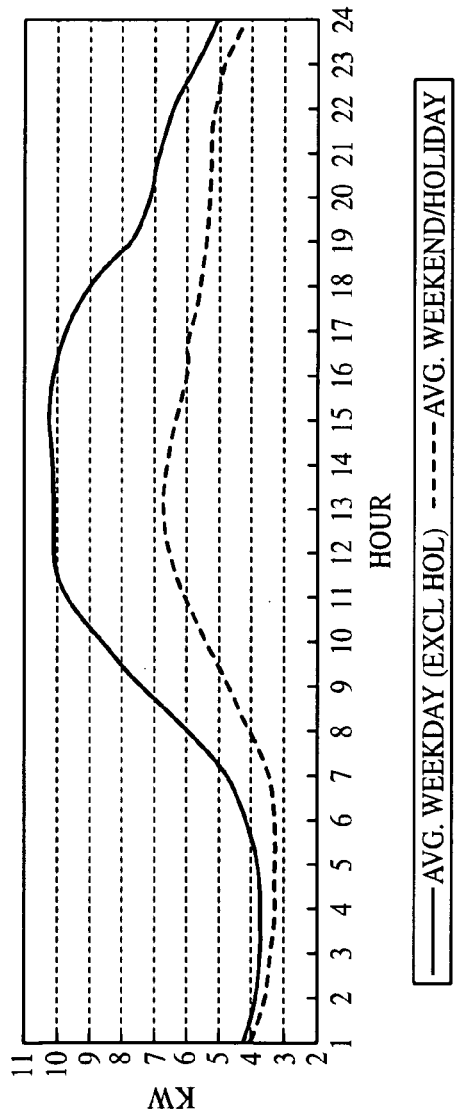
FIG. 2c is a graphical representation of a load profile for a typical class (General Service Secondary) GS commercial customer.
Figure 2D:
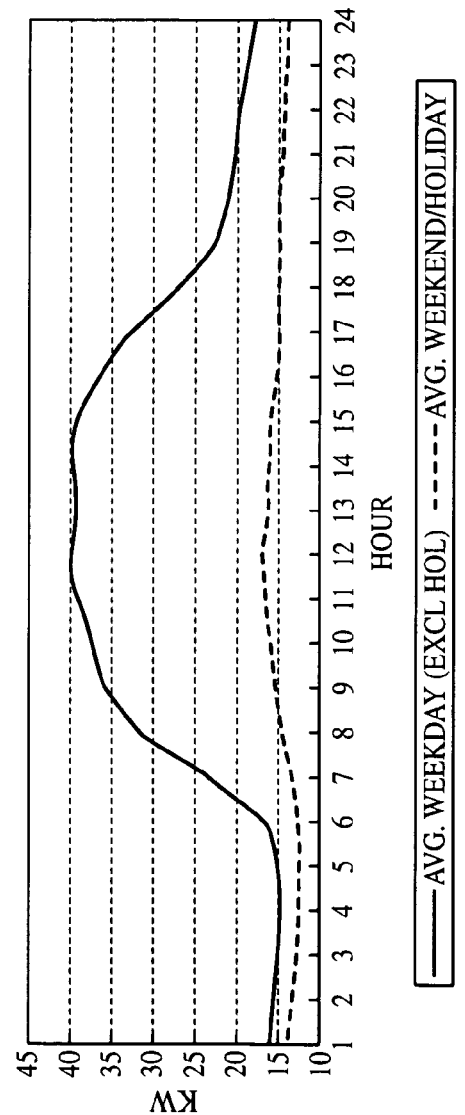
FIG. 2d is a graphical representation of a load profile for a typical class GS industrial customer.
Figure 2E:
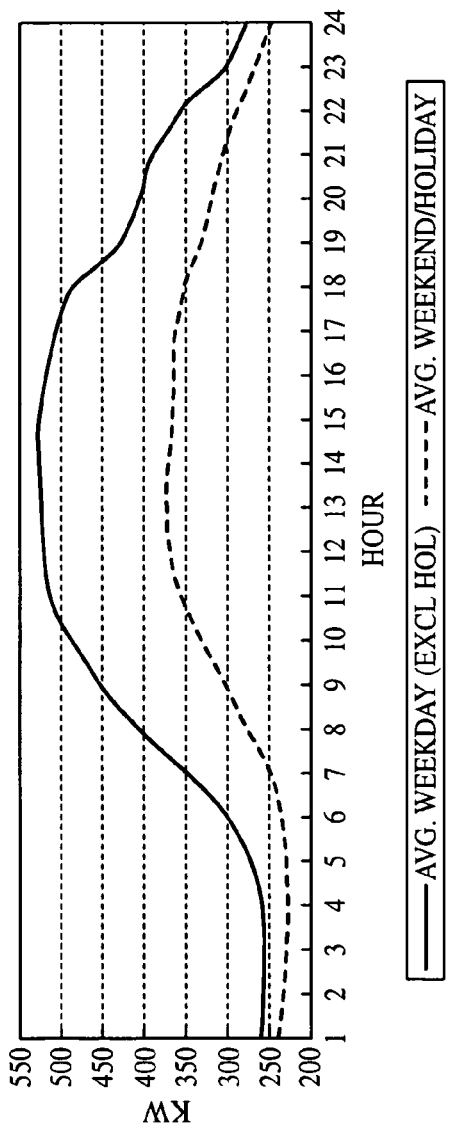
FIG. 2e is a graphical representation of a load profile for a typical class (General Service Secondary Time-of-Day) GST commercial customer.
Figure 2F:
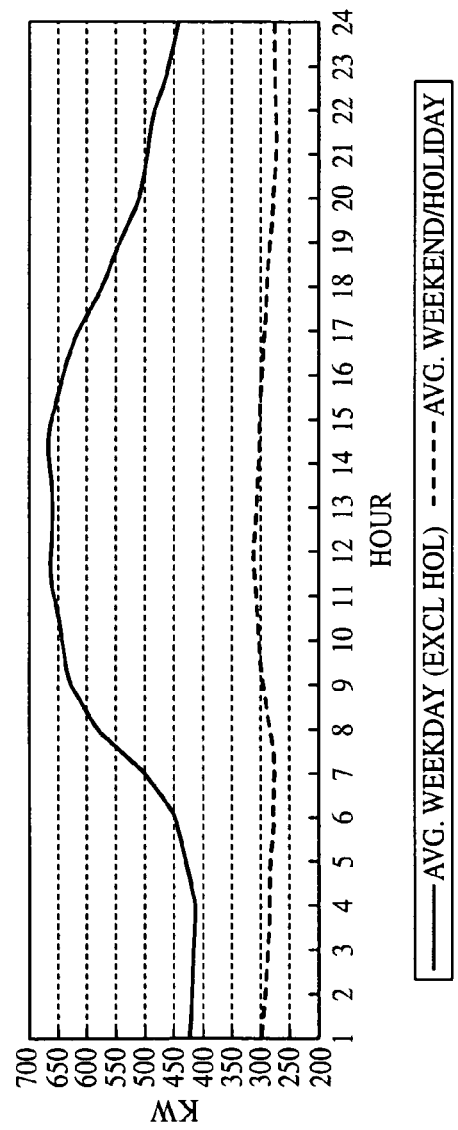
FIG. 2f is a graphical representation of a load profile for a typical class GST industrial customer.
Figure 2G:
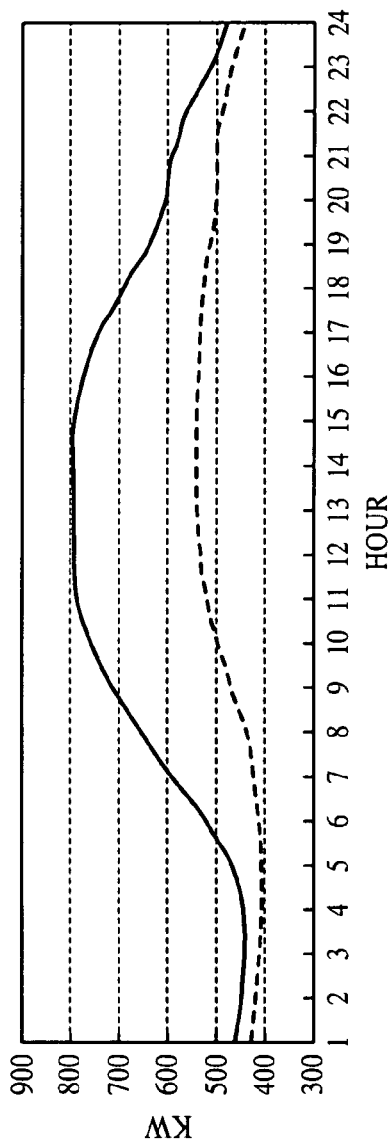
FIG. 2g is a graphical representation of a load profile for a typical class (General Service Primary) GP commercial customer.
Figure 2H:
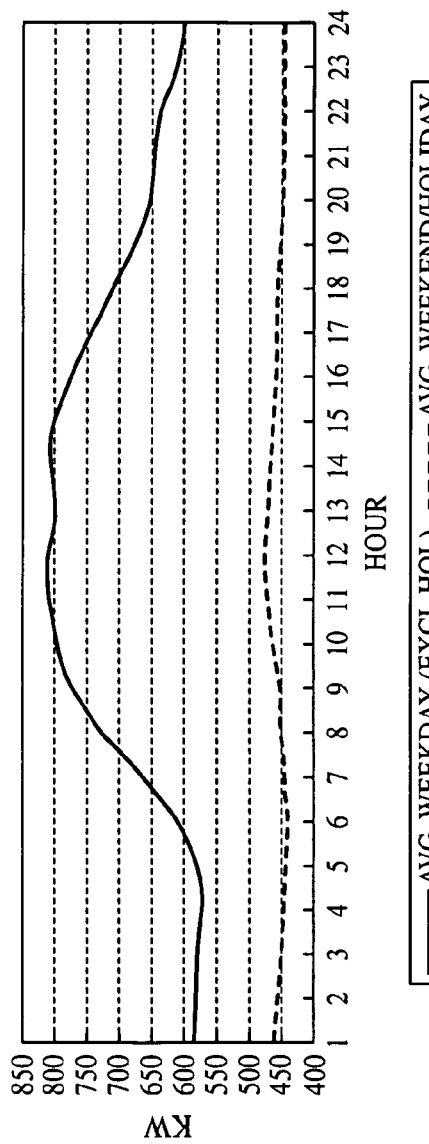
FIG. 2h is a graphical representation of a load profile for a typical class GP industrial customer.
Figure 2I:
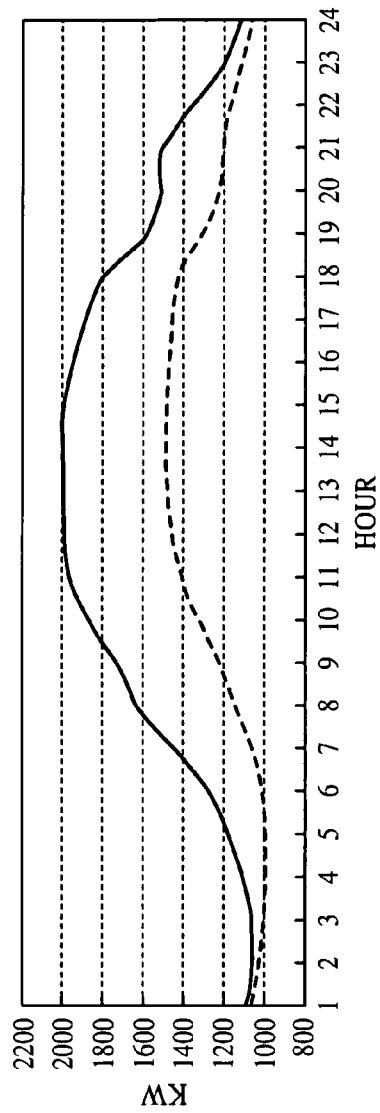
FIG. 2i is a graphical representation of a load profile for a typical class (General Service Transmission) GT commercial customer.
Figure 2J:
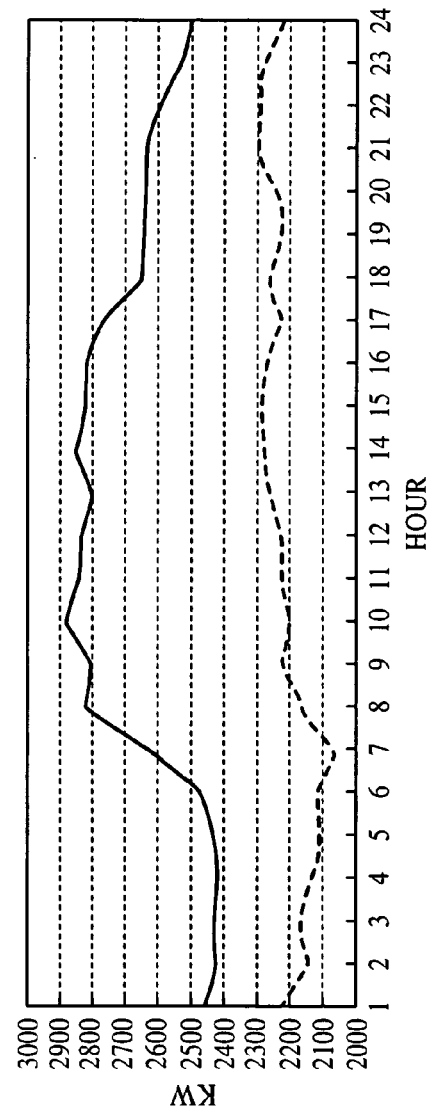
FIG. 2j is a graphical representation of a load profile for a typical class GT/GTX industrial customer.

Referring now to FIGS. 2a through 2j there are shown representative load profiles for July 1999, which are found in GPU's Energy compliance filing of Aug. 6, 1999. The plots show average weekday and average weekend/holiday load demand for a particular class of customer. FIG. 2a shows the load profile for a typical class RS customer. FIG. 2b shows the load profile for a typical class RT customer. FIG. 2c shows the load profile for a typical class GS commercial customer. FIG. 2d shows the load profile for a typical class GS industrial customer. FIG. 2e shows the load profile for a typical class GST commercial customer. FIG. 2f shows the load profile for a typical class GST industrial customer. FIG. 2g shows the load profile for a typical class GP commercial customer. FIG. 2h shows the load profile for a typical class GP industrial customer. FIG. 2i shows the load profile for a typical class GT commercial customer. FIG. 2j shows the load profile for a typical class GT/GTX industrial customer.

Figure 3:
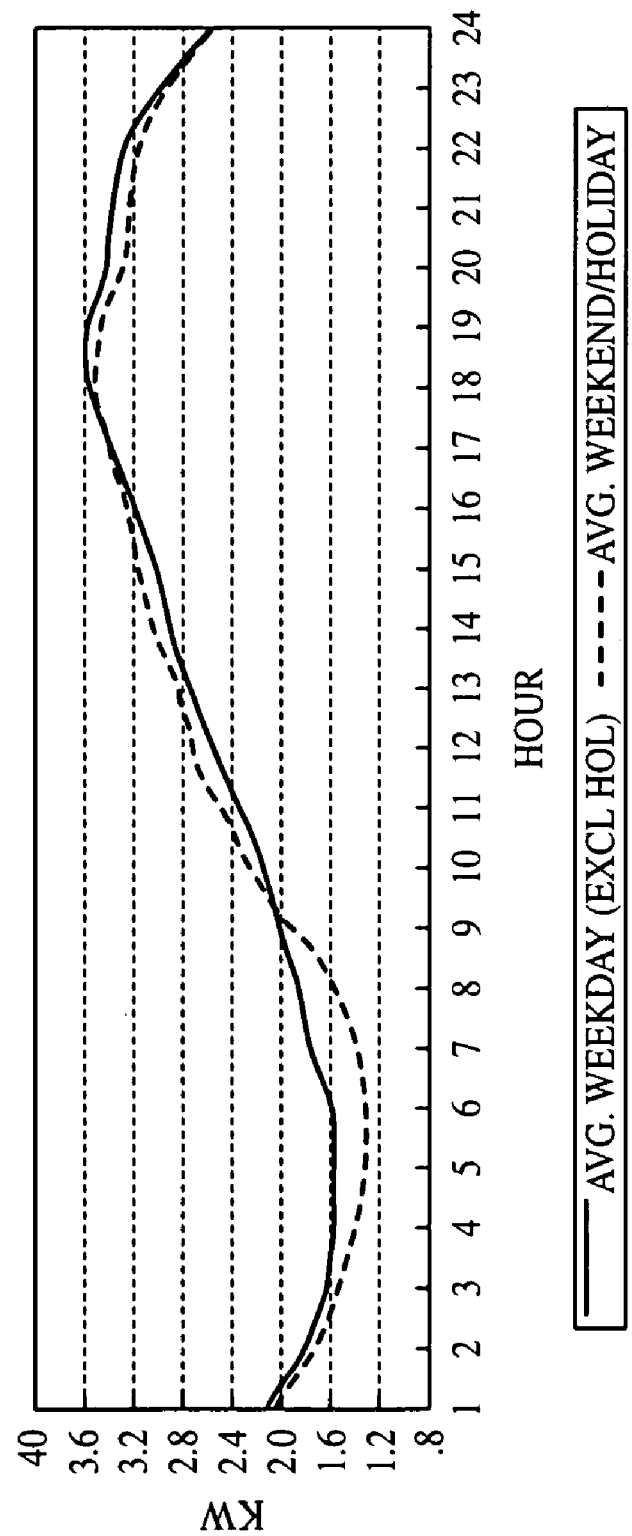
FIG. 3 is a graphical representation of an aggregation of twenty typical RS customers.
Figure 4:
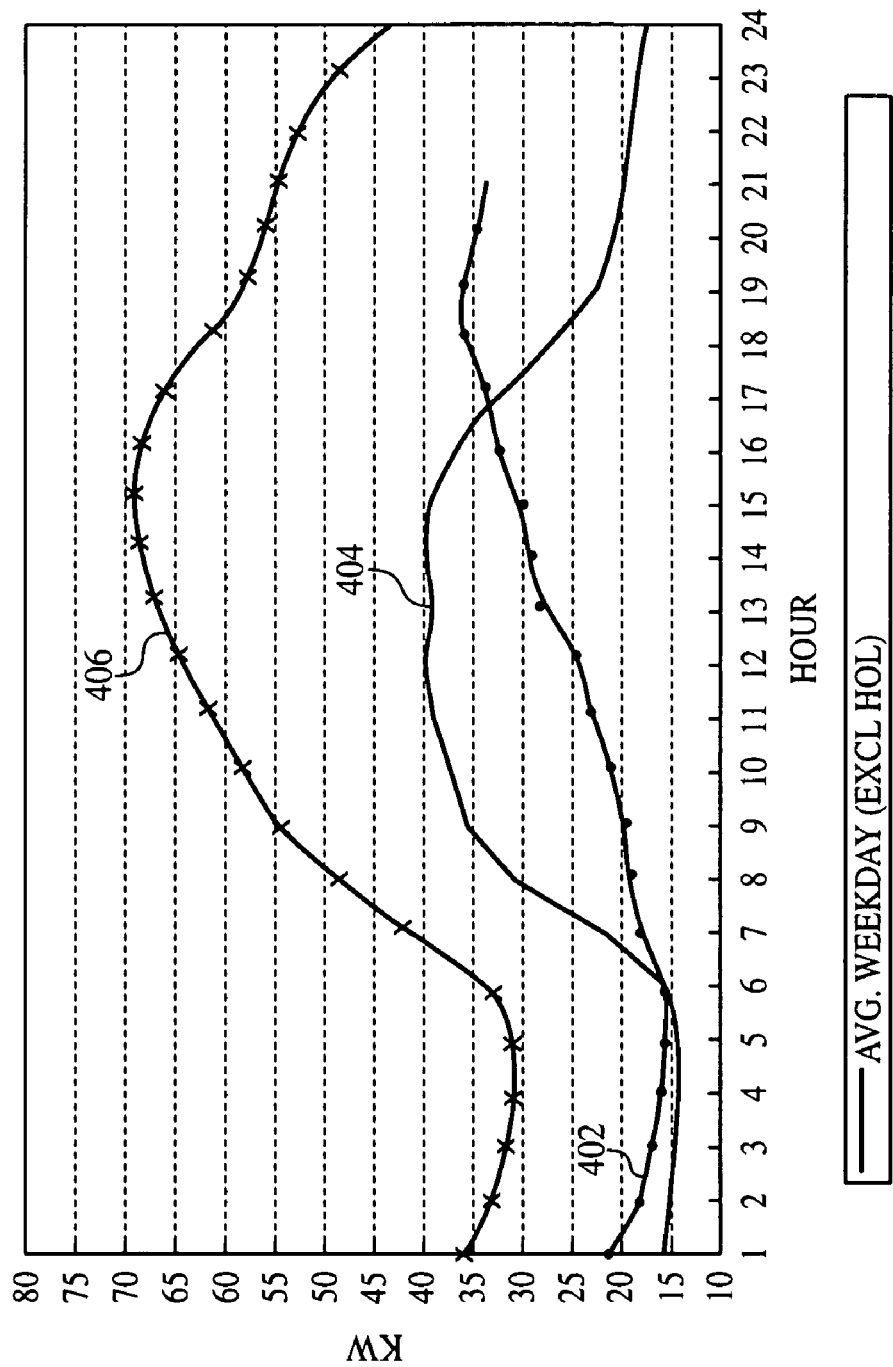
FIG. 4 is a graphical representation of a further aggregation of customers.

Referring to FIG. 3 there is shown an aggregation of twenty typical RS customers. Referring to FIG. 4, when the aggregation of twenty RS customers 402 (represented by FIG. 3) are further aggregated with the GS industrial customer 404 (represented by FIG. 2d) the resultant aggregated customer pool 406 shows leveling of peak load in the evening hours. Actual customer load profiles, such as for large industrial or commercial customers, as well as customers equipped with intelligent meters can be utilized in place of a typical load profile, thus enabling a more accurate aggregate customer profile to be constructed.

Dynamic forecasting is based on projected customer demand determined by historic use both of specific users as well as general historic use for a class of user (residential, bed room community, urban residential, industrial, commercial, etc.) and adjusted as a function of environmental influences (temperature, humidity, weather (rain/snow/fog), time of day, day of year, day of week, holidays, news events, etc.) thus enabling closed-loop control of the utility network. The forecasting models would be fine tuned and adjusted by an intelligent agent to be reflective of the conditions monitored and load-demand.

Figure 5:
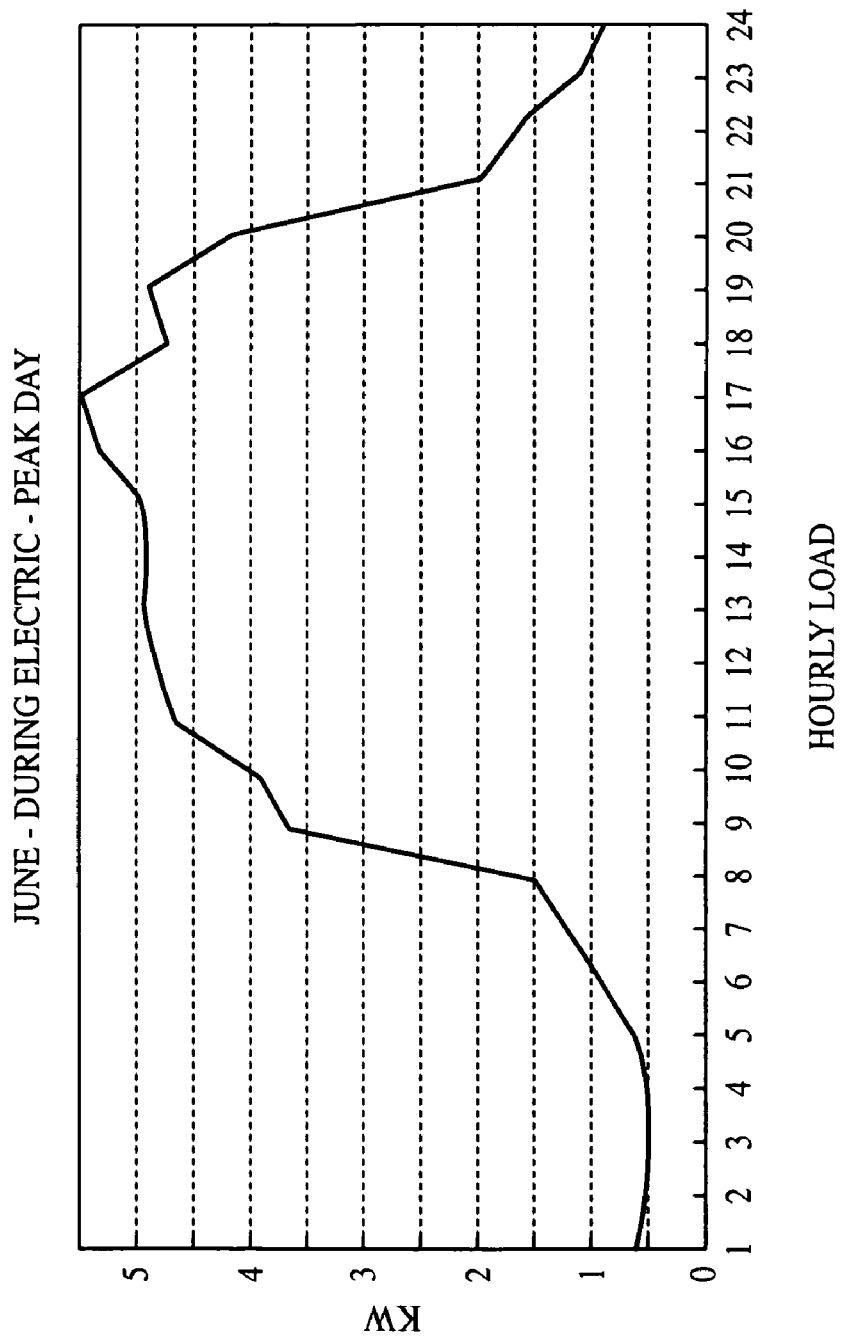
FIG. 5 is a graphical representation of an hourly load profile on a June peak day for a 2000 sq. ft. urban residence created utilizing a DOE-2 simulation with DOE (Department of Energy) data.
Figure 6:
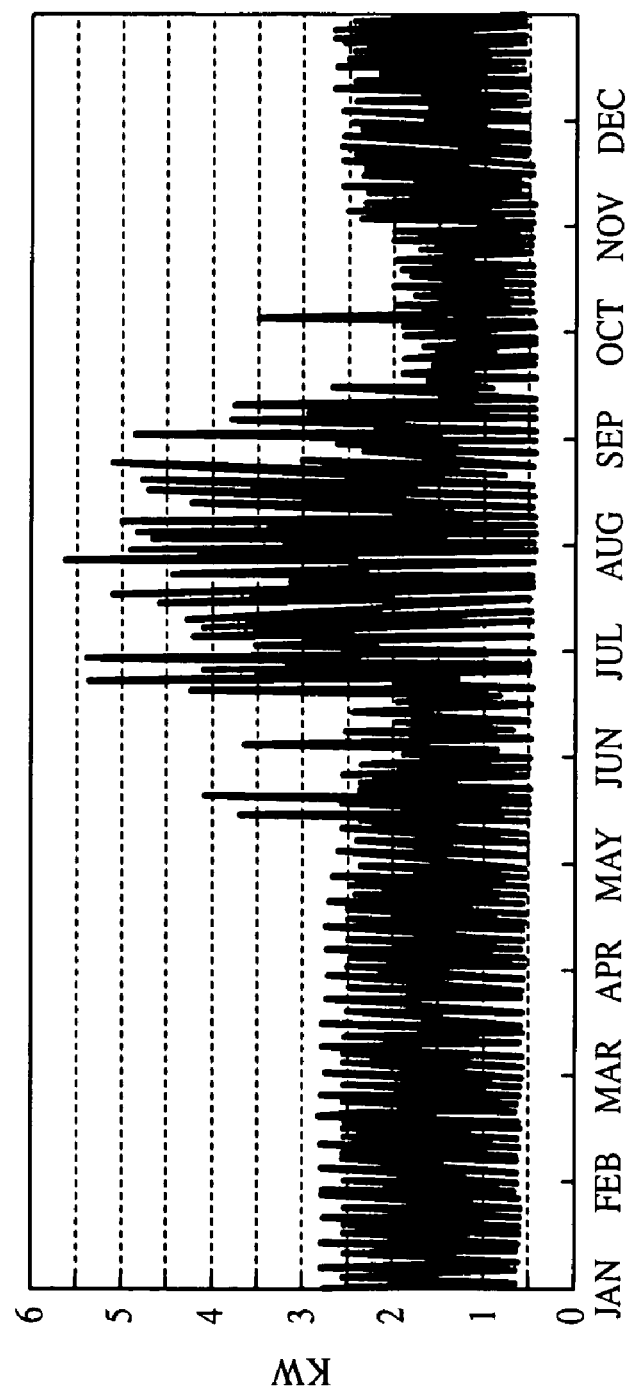
FIG. 6 is a graphical representation of an annual DOE-2 simulation load profile for a 2000 sq. ft. urban residence with gas heat and electric air conditioning.

The Department Of Energy ("DOE") has compiled extensive data relating to power consumption. Their database enables constructing of load profiles which take into account physical building type, size, physical location, neighborhood setting (urban, suburban, rural, etc.), glass to wall ratios, type of glass, primary structure frame width, insulation, primary wall materials, type of ceilings and attics, roof color, basement type as well as occupancy characteristics and types of appliances. Referring to FIG. 5 there is shown an hourly load profile on a June peak day for a 2000 sq. ft. urban residence created with through a DOE-2 simulation utilizing DOE data. The DOE data enables the creation of detailed load profiles permitting sophisticated aggregation. FIG. 6 represents an annual DOE-2 simulation load profile for a 2000 sq. ft. urban residence with gas heat and electric air conditioning. By collecting customer survey data the DOE-2 simulation enables generation of extensively detailed load profiles without requiring actual detailed load usage data.

Controlled Feedback Overview

Figure 7:
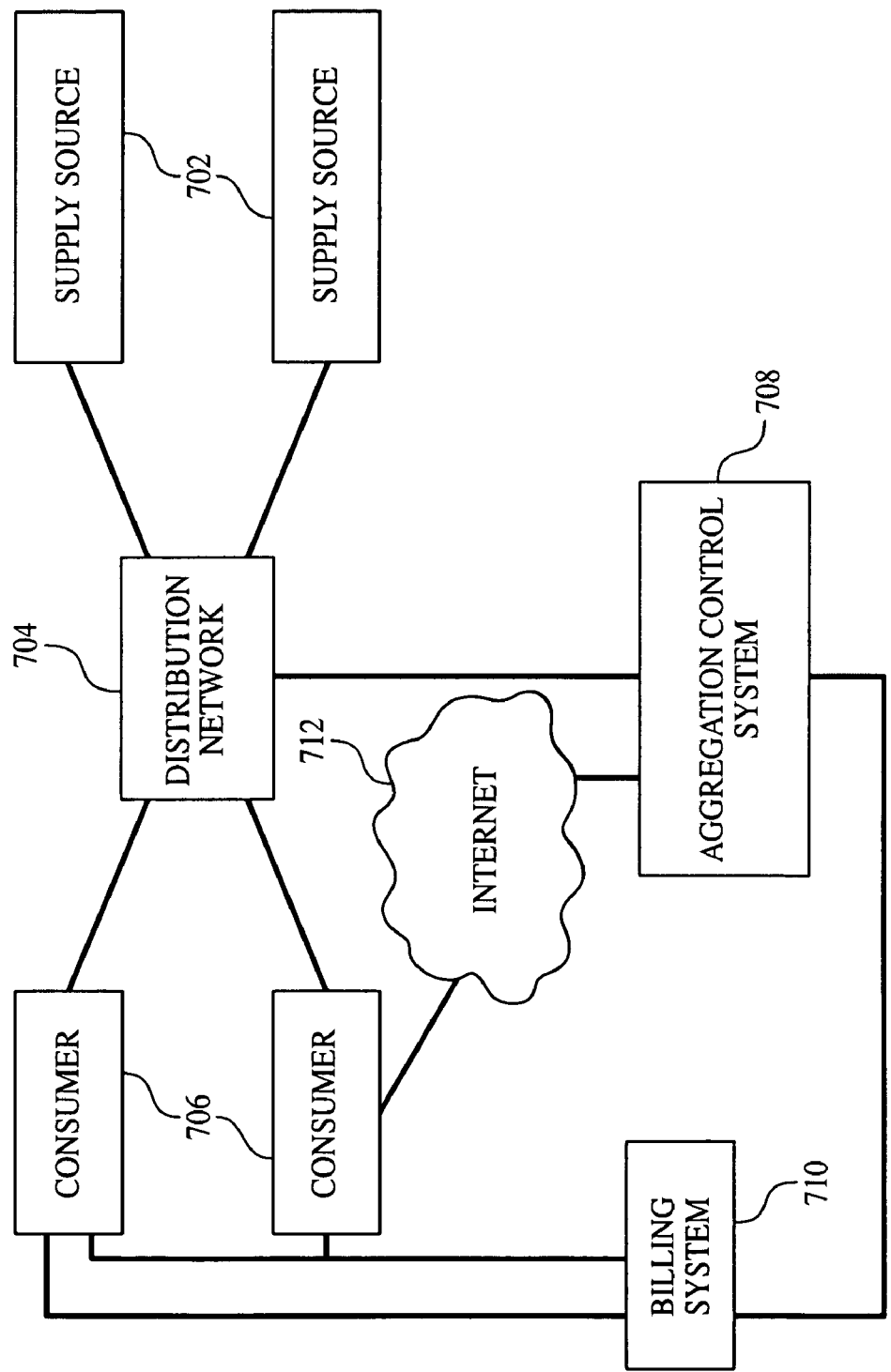
FIG. 7 is a diagrammatic representation of a utility network utilizing the present invention method and system for dynamic utility resource aggregation and allocation.

Referring to FIG. 7 there is shown a diagrammatic representation the present invention dynamic utility resource aggregation and allocation by controlled feedback used with an electrical energy network. Utility supply sources 702 are coupled to a utility distribution network 704. A plurality of consumers 706 are coupled to the utility distribution network 704. Referring back to FIG. 1 there can be seen the details of a typical electrical utility distribution system. An aggregation control system 708 is coupled to the utility distribution network 704, a billing system 710 and the consumers 706. The plurality of consumers 706 can be directly coupled to the aggregation control system 708 or through a packet switching network such as the Internet 712. The billing system may also be accessed by the plurality of consumers 706 through the Internet 712.

A particular consumer 706 can utilize intelligent metering to restrict some energy utilization when balancing is necessary or in order to obtain the best rates as determined by the aggregation control system 708. Billing can be handled through the traditional mechanisms or by the billing system 710, which is partially controlled by the aggregation control system 708. The billing system 710 may be a part of or interface with a comprehensive billing consolidation system.

In its simplest form a nearby constant load profile is easiest from a resource supplier viewpoint to manage because of the long-term predictability. But this invention contemplates varying loads as well as varying resource supply, is dynamic load/user solutions.

Another complexity in forming sub groups with compatible requirements so as to optimize the group economics is the rate class of the individual subscribers, the applicable tariffs set by State/Federal Regulators and the seasonal variations in loads and charges. All of these factors must be taken into account by system 708.

Figure 8:
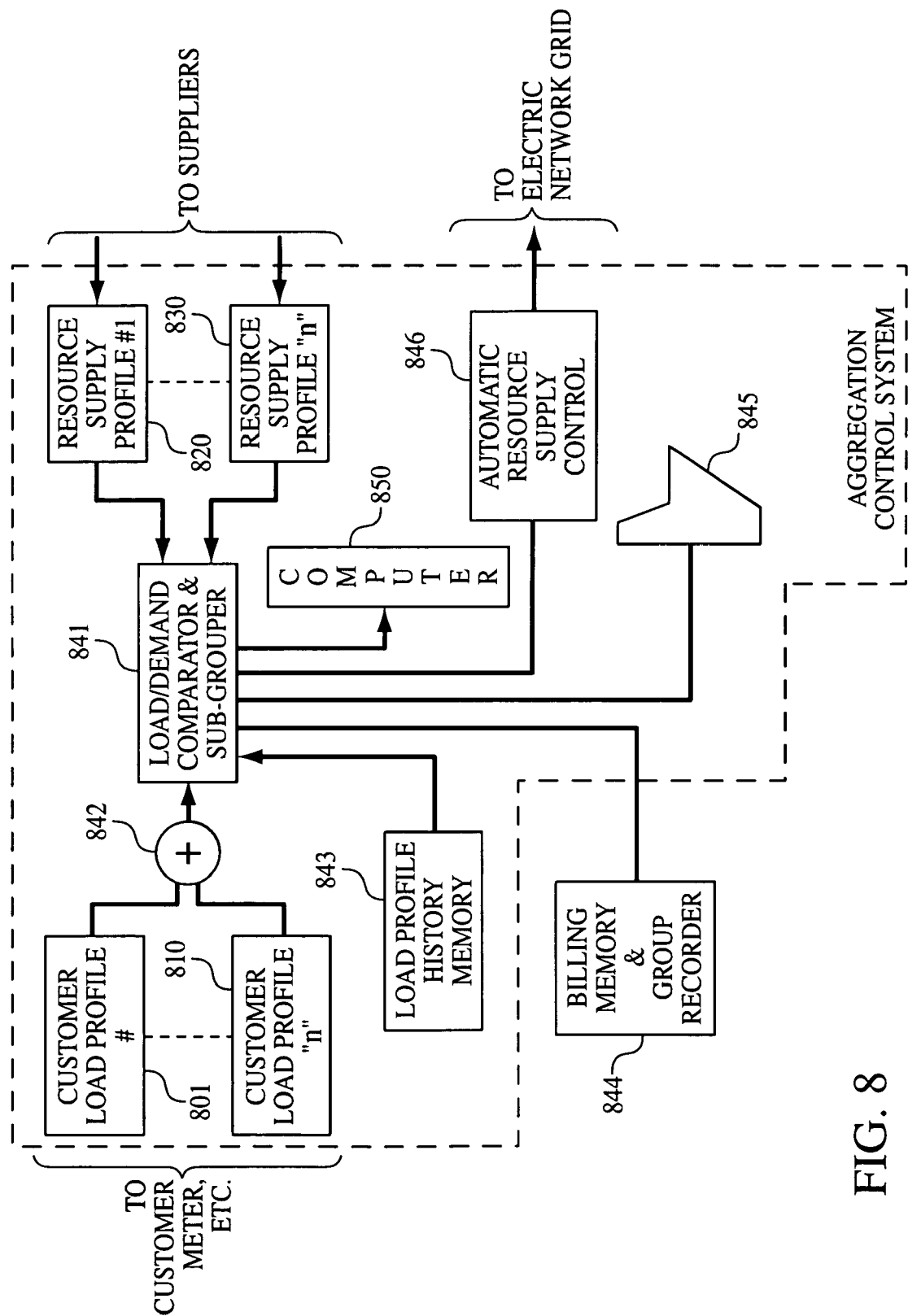
FIG. 8 is a diagrammatic representation of one embodiment of an aggregation control system.

In the upper center of FIG. 8 there is shown a Load/Demand comparator and Sub-Grouper unit 841 which essentially works with Summer 842 to form sub groups out of various individual load profiles 801–910 assigns the formal sub groups to a particular resource supply, which for example, are depicted by blocks 020 through 830. The sub groups profile match to a particular supplier is based upon lowest kilowatt pricing and best user group profile-to-supplier profile.

Unit 841 assigns the sub group to the resource supply for a period determined by contract and for as long as the price per kilowatt remains competitive. It will be obvious to one skilled in the art that the foregoing can be run by a computer; e.g. computer 850 with appropriate logic. Additionally, the criteria for sub group formation can include for example, a load profile history memory 843 which contains historic, as discussed previously, rather than dynamic indications of load profiles. As shown in FIG. 8, memory 843 is connected to sub group 841 to be used to form the Customer sub group which is then assigned to the optimum resource supply 820 through 830.

Alternatively, position 845 shown at the bottom of FIG. 8 can be used to manually adjust the membership of a sub group for a desired period to manually optimize load profiles and to over ride the dynamic controls of sub group 841. It is contemplated that appropriate visual indications would appear at position 845 as well as controls to implement manual sub group formation and/or assignment to resource supplier.

A complete system would necessarily require a billing system which, working with sub group 841, could apportion costs based on actual usage and an apportioned cost of the total sub group consumption. This is shown diagrammatically on the lower left as Recorder 844 and is also shown in FIG. 7 as Billing System 710.

Referring now to FIG. 8, there is shown in block diagram form a detailed schematic representation of an Aggregation Control System 708 of FIG. 7 which will serve as a basis for a more detailed discussion of the methods and systems for grouping customers in accordance with this invention. To the left side of FIG. 8 a series of data memory units labeled Customer Load profile #1 designated by the numeric 801 to Customer Load Profile "n" given the designation numeric 810. Each memory unit is connected to a summer 842 which functions as an arithmetic summer to combine outputs of selected ones of the data memory units to determine a near "flat line" response. FIGS. 2a through 2j depict typical data profiles for individual users and FIGS. 4 and 5 show the output for grouped users.

It is well known that resource suppliers such as those depicted to the upper right of FIG. 8 by the blocks labeled Resource Supply Profile "n" designated 830, are desirous of a load profile which most approximates the supply profile or power availability profile.

Figure 9:
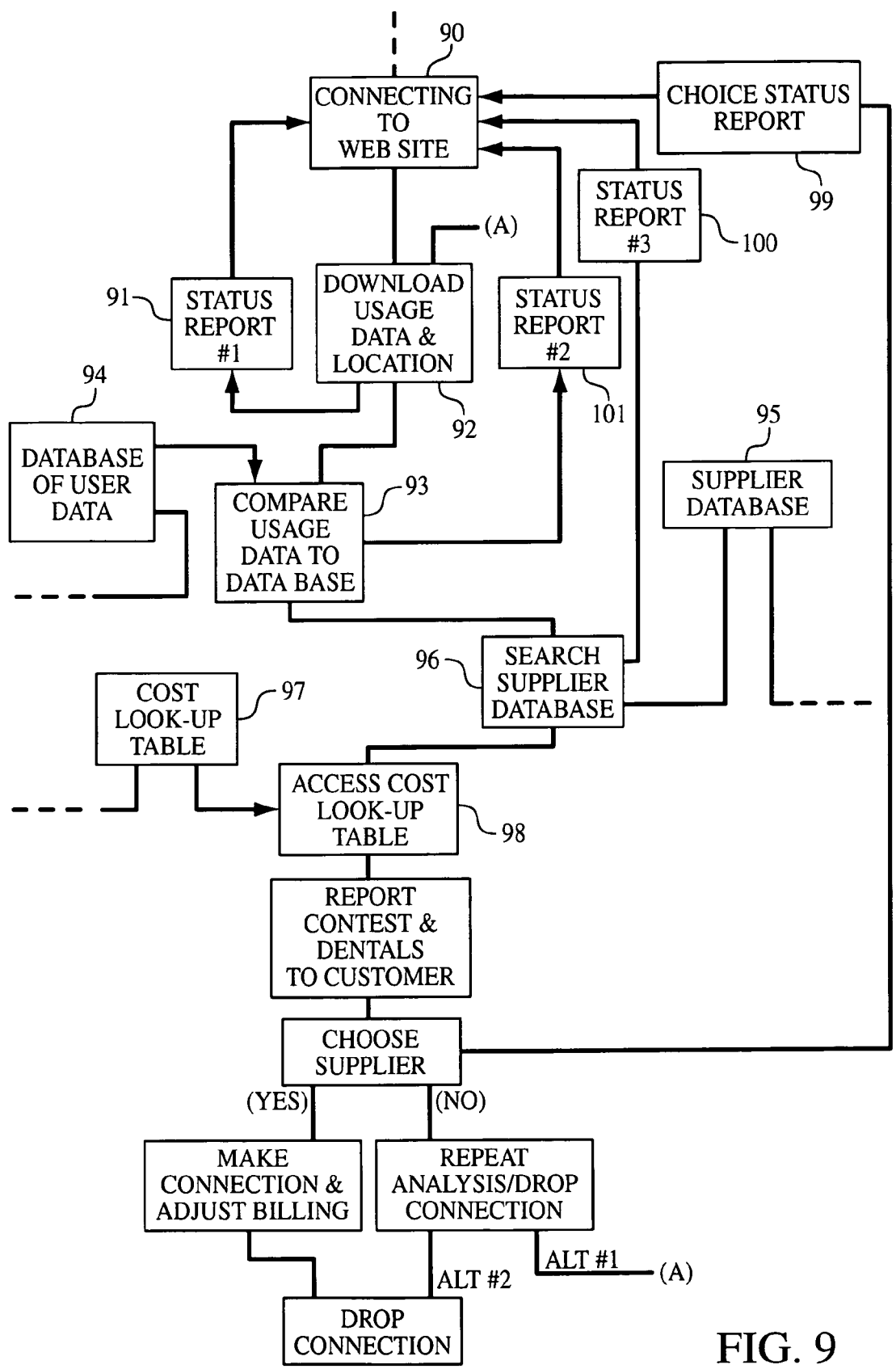
FIG. 9 depicts a flow diagram of the logic steps involved in an internet connection to a web site having an automatic aggregator.

FIG. 9 describes in flow diagram format the control logic and interplay between a customer seeking to aggregate with other users to optimize (minimize) cost per kilowatt-hour and a website with an automatic aggregator system available through the website portal. Initially, a user accesses the website in the usual fashion by either typing the website address or being linked from another website. The website automatically downloads the load profile and location data or requests the user to input the data in the usual fashion. When the proper information is received a status report responds to the user with the first of three status reports indicating that the aggregator system is working on a solution. The aggregator next compares at unit 93 the user data with a data base 94 of other users (subscribers) data to ascertain a proper user group to assign the new user to, and the impact (improving or deteriorating) on load profile of the entire user group. If a profile match within design limits is successful the next logic step is to search supplier database 95 for an optimum (minimum) cost match. If, a match is found the estimated cost is found in a look-up table 97 using an access table 98. It should be noted that status reports are forwarded to the customer during this process such as, status report #2, sent to confirm a user sub-group assignment, and status report #3, sent to confirm a supplier match. The final report is sent when a price per kilowatt-hour, and the billing details (e.g. monthly billing, etc.).

If the first attempt is unsuccessful then the aggregator will make a second attempt using a different user sub-group the next time. The next attempt is at the user's option, who can choose to disconnect from the website in the alternative.

The logic chosen to run this program advantageously makes maximum use of shared databases internally so that more that one user can attach to the website simultaneously. This can be observed, for example, at data 94, base 95 and table 97 each of which operate totally independently.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for utility capacity management comprising the steps of:
   using a computer to determine a supply profile from capacity over time of a utility supplier;
   using the computer to determine usage over time of a plurality of utility users;
   using the computer to ascertain an impact on a composite load profile of an aggregate user group that contains multiple users upon incorporating therein individual load profiles of one or more additional users to provide an aggregate load profile reflecting an aggregate usage over time of a combination of that of the composite load profile and the individual load profiles;
   using the computer to compare the aggregate load profile with the supply profile of the utility supplier;
   using the computer to aggregate the one or more additional users into the aggregate user group provided that the aggregate load profile better approximates the supply profile of the utility supplier than the composite load profile because of leveling of peak load otherwise present in the composite load profile;
   using the computer to determine the unused capacity over time for the aggregate user group by subtracting the aggregate user group's usage over time from the supplier's capacity over time; and
   selecting the aggregate user group as a selected one of different aggregate user groups to be supplied by the supplier, the selected one of the different aggregate user groups yielding least unused capacity overtime.

2. The method according to claim 1, further comprising the step of:
   repeating the steps of using the computer to compare, aggregate, and determine the unused capacity for two or more different aggregate user groups.

3. The method according to claim 2, further comprising the step of reporting selection of the selected one of the different aggregate user groups.

4. The method according to claim 2, wherein the repeating is dynamically performed by using instantaneous data load profiles at a regular interval of time.

5. The method according to claim 1, wherein using the computer to compare, aggregate, and determine are dynamically performed by using instantaneous data load profiles at a regular interval of time.

6. The method according to claim 1, wherein the processor is configured for carrying out the receiving information indicative of usage over time for a plurality of utility users by being based on feedback from intelligent metering, pool use metering and dynamic forecasting.

7. A system for utility capacity management, comprising:
   a computer having a processor in communication with computer memory and at least one device for inputting data and at least one device for output, the processor being configured for:
   receiving information indicative of capacity over time for one or more utility suppliers to determine at least one supply profile;
   receiving information indicative of usage over time for a plurality of utility users;
   aggregating usage over time for multiple utility users to determine a composite load profile of the aggregated usage over time,
   determining an impact on the composite load profile upon incorporating therein the usage over time of at least one individual utility user to form an aggregate load profile;
   comparing the at least one supply profile with the aggregate load profile;
   aggregating the individual user into an aggregate user group with the multiple utility users provided the aggregate load profile better approximates the supply profile than the composite load profile because of leveling of peak load;
   using the computer to determine the unused capacity over time for the aggregate user group by subtracting the aggregate user group's usage over time from the supplier's capacity over time; and
   selecting the aggregate user group as a selected one of different aggregate user groups to be supplied by the supplier, the selected one of the different aggregate user groups yielding least unused capacity overtime.

8. The system in accordance with claim 7, wherein the processor is further configured to:
   match each utility supplier, an aggregate of utility users which, subtracting the aggregate users' usage over time from the utility supplier's capacity over time to calculate an unused capacity over time, results in the unused capacity over time having the least unused capacity summed over the time; and
   output to the one or more output devices the determined match for each utility supplier.

9. The system according to claim 7, wherein the step of using the computer to determine usage over time of a plurality of utility users is based on feedback from intelligent metering, pool use metering and dynamic forecasting.

* * * * *